US011836219B2

(12) United States Patent
Sharma Mittal et al.

(10) Patent No.: US 11,836,219 B2
(45) Date of Patent: Dec. 5, 2023

(54) TRAINING SAMPLE SET GENERATION FROM IMBALANCED DATA IN VIEW OF USER GOALS

(71) Applicant: International Business Machines Corporation, Armonk, NY (US)

(72) Inventors: Ruhi Sharma Mittal, Bangalore (IN); Lokesh Nagalapatti, Chennai (IN); Hima Patel, Bangalore (IN); Nitin Gupta, Saharanpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 17/518,156

(22) Filed: Nov. 3, 2021

(65) Prior Publication Data

US 2023/0136125 A1    May 4, 2023

(51) Int. Cl.
*G06F 18/2115* (2023.01)
*G06F 18/211* (2023.01)
(Continued)

(52) U.S. Cl.
CPC .......... *G06F 18/214* (2023.01); *G06F 18/211* (2023.01); *G06F 18/2115* (2023.01);
(Continued)

(58) Field of Classification Search
CPC ........ G06N 20/00; G06N 20/20; G06N 20/10; G06N 3/08; G06N 3/02; G06N 3/082;
(Continued)

(56) References Cited

U.S. PATENT DOCUMENTS 7,640,470 B2    12/2009    Lammel et al.
9,224,104 B2    12/2015    Lin et al.
(Continued)

FOREIGN PATENT DOCUMENTS

CN    107305640 A    10/2017
CN    112784908 A    5/2021
(Continued)

OTHER PUBLICATIONS

Jong Myong Choi, "A Selective Sampling Method for Imbalanced Data Learning on Support Vector Machines", Graduate Theses and Dissertations, Iowa State University Digital Repository, 2010, 107 pages, Iowa State University.
(Continued)

*Primary Examiner* — Matthew C Bella
*Assistant Examiner* — Dennis Rosario
(74) *Attorney, Agent, or Firm* — Ference & Associates LLC

(57) ABSTRACT

One embodiment provides a method, including: receiving a sample set for training a machine-learning model, wherein the sample set includes a plurality of classes, wherein classes within the plurality of classes have an imbalance in a number of samples; creating an enlarged minority class by generating new samples from the samples within the minority class and adding the new samples to the minority class; selecting subset samples from both the samples within the enlarged minority class and the majority class; weighting each of the subset samples based upon user input defining goals for attributes of a training sample set to be used in training the machine-learning model; and generating, using the neural network, the training sample set by re-running the selecting in view of the weighting.

20 Claims, 3 Drawing Sheets

(51) Int. Cl.
   *G06N 20/00* (2019.01)
   *G06N 3/08* (2023.01)
   *G06F 18/214* (2023.01)
   *G06F 18/21* (2023.01)
   *G06F 18/2431* (2023.01)

(52) U.S. Cl.
   CPC ...... *G06F 18/2178* (2023.01); *G06F 18/2431* (2023.01); *G06N 3/08* (2013.01); *G06N 20/00* (2019.01)

(58) Field of Classification Search
   CPC .. G06F 16/285; G06F 16/906; G06F 16/3346; G06F 16/35; G06F 18/24; G06F 18/241; G06F 18/2431; G06F 18/254; G06F 18/211; G06F 18/2115; G06F 18/24323; G06F 18/24317; G06F 18/2433; G06F 18/243; G06F 18/2415; G06F 18/24155; G06F 18/2411; G06F 18/23; G06F 18/231; G06F 18/2321; G06F 18/23211; G06F 18/23213; G06F 18/214; G06F 16/353; G06F 16/355; G06F 16/55; G06F 16/45; G06F 16/65; G06F 16/75; A61B 5/7264; A61B 5/7267; G06V 10/82; G06V 10/945
   See application file for complete search history.

(56) References Cited

U.S. PATENT DOCUMENTS

2016/0019271 A1  1/2016  Ma et al.
2019/0213605 A1* 7/2019  Patel ................... G07C 5/0808
2020/0342265 A1  10/2020 Cai et al.
2021/0287136 A1* 9/2021  Das ....................... G06Q 20/20

FOREIGN PATENT DOCUMENTS

WO   WO2007115426 A2   10/2007
WO   WO2019041629 A1   3/2019

OTHER PUBLICATIONS

Haibo He et al., "ADASYN: Adaptive Synthetic Sampling Approach for Imbalanced Learning", 2008, 7 pages, IEEE Digital Library.
Sumanth Dathathri et al., "Plug and Play Language Models: A Simple Approach to Controlled Text Generation", ICLR 2020, Mar. 3, 2020, 34 pages, ICLR.
Shuo Wang et al, "A Learning Framework for Online Class Imbalance Learning", 2013, 10 pages, IEEE Digital Library.
Anh Nguyen et al., "Plug & Play Generative Networks: Conditional Iterative Generation of Images in Latent Space", Computer Vision Foundation, 2017, 11 pages, IEEE Digital Library.

* cited by examiner

TRAINING SAMPLE SET GENERATION FROM IMBALANCED DATA IN VIEW OF USER GOALS

BACKGROUND

Machine-learning is the ability of a system to learn without being explicitly programmed to perform some function. Thus, machine-learning allows a programmer to initially program an algorithm that can be used to predict responses to data, without having to explicitly program every response to every possible scenario that the system may encounter. In other words, machine-learning uses algorithms that the system uses to learn from and make predictions regarding to data. Machine-learning provides a mechanism that allows a programmer to program a system for computing tasks where design and implementation of a specific algorithm that performs well is difficult or impossible. To implement machine-learning, the system is initially taught using machine-learning models that are trained using sample inputs or training datasets which include annotations or labels that identify a correct classification. The model generates classification boundaries from the training dataset which allows the model to make predictions with respect to data not having annotations or labels.

BRIEF SUMMARY

In summary, one aspect of the invention provides a method, including: receiving a sample set for training a machine-learning model, wherein the sample set comprises a plurality of classes, each of the plurality of classes having corresponding samples, wherein the sample set comprises a minority class within the plurality of classes having a lower number of samples as compared to a number of samples within a majority class within the plurality of classes; creating an enlarged minority class by generating, for the minority class, new samples from the samples within the minority class and adding the new samples to the minority class; selecting, using a neural network, subset samples from both the samples within the enlarged minority class and the majority class, wherein the selecting comprises generating a probability score for each of the samples within the enlarged minority class and the majority class and selecting samples for the subset samples having a probability score at least meeting a predetermined threshold; weighting each of the subset samples based upon user input defining goals for attributes of a training sample set to be used in training the machine-learning model; and generating, using the neural network, the training sample set by re-running the selecting in view of the weighting.

Another aspect of the invention provides an apparatus, including: at least one processor; and a computer readable storage medium having computer readable program code embodied therewith and executable by the at least one processor; wherein the computer readable program code is configured to receive a sample set for training a machine-learning model, wherein the sample set comprises a plurality of classes, each of the plurality of classes having corresponding samples, wherein the sample set comprises a minority class within the plurality of classes having a lower number of samples as compared to a number of samples within a majority class within the plurality of classes; wherein the computer readable program code is configured to create an enlarged minority class by generating, for the minority class, new samples from the samples within the minority class and adding the new samples to the minority class; wherein the computer readable program code is configured to select, using a neural network, subset samples from both the samples within the enlarged minority class and the majority class, wherein the selecting comprises generating a probability score for each of the samples within the enlarged minority class and the majority class and selecting samples for the subset samples having a probability score at least meeting a predetermined threshold; wherein the computer readable program code is configured to weight each of the subset samples based upon user input defining goals for attributes of a training sample set to be used in training the machine-learning model; and wherein the computer readable program code is configured to generate, using the neural network, the training sample set by re-running the selecting in view of the weighting.

An additional aspect of the invention provides a computer program product, including: a computer readable storage medium having computer readable program code embodied therewith, the computer readable program code executable by a processor; wherein the computer readable program code is configured to receive a sample set for training a machine-learning model, wherein the sample set comprises a plurality of classes, each of the plurality of classes having corresponding samples, wherein the sample set comprises a minority class within the plurality of classes having a lower number of samples as compared to a number of samples within a majority class within the plurality of classes; wherein the computer readable program code is configured to create an enlarged minority class by generating, for the minority class, new samples from the samples within the minority class and adding the new samples to the minority class; wherein the computer readable program code is configured to select, using a neural network, subset samples from both the samples within the enlarged minority class and the majority class, wherein the selecting comprises generating a probability score for each of the samples within the enlarged minority class and the majority class and selecting samples for the subset samples having a probability score at least meeting a predetermined threshold; wherein the computer readable program code is configured to weight each of the subset samples based upon user input defining goals for attributes of a training sample set to be used in training the machine-learning model; and wherein the computer readable program code is configured to generate, using the neural network, the training sample set by re-running the selecting in view of the weighting.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
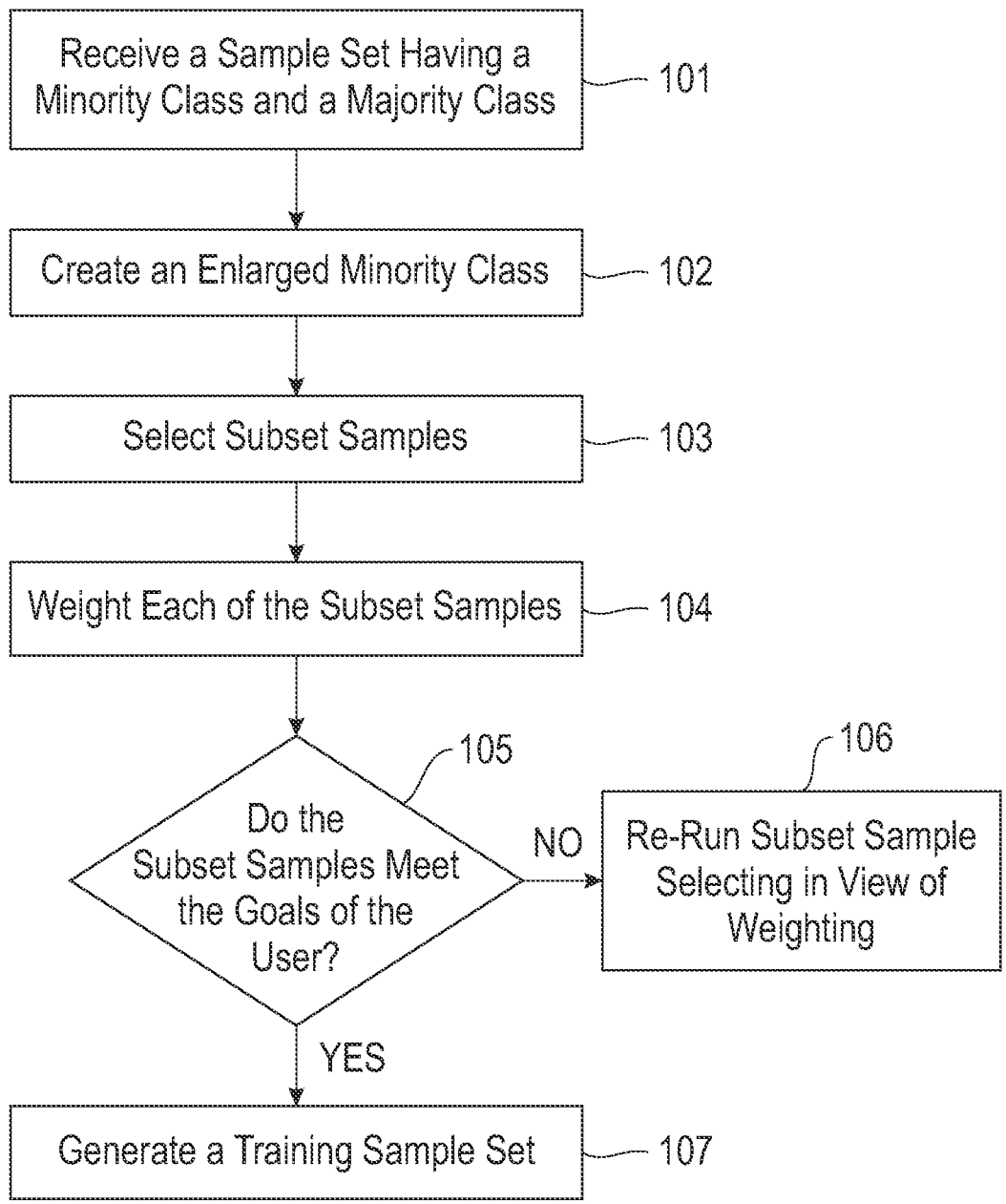
FIG. 1 illustrates a method of generating a training sample set for training a machine-learning model from a sample set that has imbalanced class sample sizes where the training sample set is generated in view of goals of a user for attributes of the training sample set.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which includes at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

To generate a training dataset for training a machine-learning model requires many different data points or samples. The more samples that are included in a training dataset, generally the better the predictions of the machine-learning model. However, not only does the sample set used to generate the training dataset need to have many different samples, but the samples need to cover different classes within the machine-learning model. Each class corresponds to a different label or annotation to be made by the machine-learning model. As a simple binary example, if the machine-learning model is to classify images of cats and dogs, the samples to be included in the training dataset would include labeled images of both the cat class and the dog class. It should be understood that this simple binary example is extremely simplified as machine-learning models may include a number of classes much greater than two. Including samples from each of the classes allows the machine-learning model to more accurately learn the boundary between classes, which allows for more accurate predictions with respect to data that the model is to classify.

When creating the training dataset, the system may obtain a set of samples that can be used in the training dataset. However, one typical problem with a set of samples is an imbalance in the number of samples between classes. A class imbalance may be a difference of a few samples to thousands of samples. Using the simplified binary class example, a class imbalance may be represented by the dog image class including a thousand images and the cat image class including ten images. A user may define what constitutes a class imbalance and so, therefore, may indicate that a difference of any amount constitutes a class imbalance or that a difference of a thousand samples does not constitute a class imbalance. Class imbalance causes a problem when training a machine-learning model in that the model will become biased towards the class, or classes, having the larger number of samples. This occurs even if the samples for the smaller class(es) are very good and accurate because the model sees too few samples as compared to the class having the larger number of samples. In other words, the model tends to classify samples into the larger class because it is the majority class.

The traditional technique to addressing class imbalance is based upon a user-selected technique. Typically, the system is programmed to either over-sample the minority class or under-sample the majority class. In over-sampling, the system utilizes the samples in the minority class to create new samples and add these to the minority class until the class imbalance has been remediated. In under-sampling, the system randomly samples or selects samples from the majority class to be utilized in the training dataset, thereby not using all of the samples included in the majority class within the training dataset. However, these techniques are set by the user and do not take into account other attributes of the samples, for example, label noise, class overlap, data distribution, and the like. By ignoring these other factors, the traditional techniques can result in a training dataset that causes the model to be inaccurate. For example, if the labels in the minority class are noisy, meaning they are inaccurate or wrong, by over-sampling the minority class, more noise is being added into the training dataset resulting in a more inaccurate model.

Accordingly, an embodiment provides a system and method for generating a training sample set for training a machine-learning model from a sample set that has imbalanced class sample sizes where the training sample set is generated in view of goals of a user for attributes of the training sample set. A system receives a sample set for training a machine-learning model. The sample set includes a plurality of classes, with at least one class imbalance where one class has fewer samples as compared to another of the classes. While a single class imbalance will be discussed herein for ease of readability, it should be understood that the sample set may have multiple class imbalances. For example, if the sample set has three classes, two of the classes may have significantly fewer samples than the third class, thereby resulting in a class imbalance. The described system can remediate any number of class imbalances.

The system creates an enlarged minority class. The minority class (or classes) is the class (or classes) that have the lower number of samples as compared to the majority class (or classes) that have the higher number of samples. The system may employ any type of over-sampling algorithm or technique that generates new samples for the minority class based upon the samples included in the minority class. These new samples are then added to the original samples of the minority class to make the enlarged minority class. Generally, the number of samples added to the minority class will be a number such that the number of samples within the enlarged minority class will equal or be within a particular range of the number of samples within the majority class.

The system employs a neural network to select subset samples from both the enlarged minority class and the majority class. When selecting the samples, the neural network analyzes the features of the samples and generates a probability score for each sample. The probability score indicates a probability that the sample should be included in the subset sample set. The samples having a probability score the meets a particular threshold will be selected to be included in the subset sample set. This set is then sent to a weighting system that weights each of the samples in the subset sample set based upon goals of the user. The goals identify a desired attribute for a training sample set that will be used to train the machine-learning model.

The weighted subset samples are sent back to the neural network which then reselects subset samples based upon the weightings. This results in samples that are included in the subset that meet or fulfill the goals of the user. An iterative process of weighting the subset samples and selecting the subset samples may occur until the user goals with respect to the subset sample set are met. Once the goals are met or a subset sample set is otherwise finalized, a training sample set will be generated by the system. This training sample set may then be used to train a machine-learning model.

Such a system provides a technical improvement over current systems for generating training datasets for machine-learning models, particularly from data sets that have imbalanced classes. The described system and method are able to remediate class imbalances in data sets in a manner that is more flexible than traditional techniques. Unlike traditional techniques that rely on a user to program a system to either perform over-sampling or under-sampling, the described system is able to automatically determine whether over-sampling, under-sampling, or a combination of both should be performed in order to make the best quality training dataset. Additionally, instead of ignoring other attributes of the data sets as with the traditional techniques, the described system can perform the generation of the training dataset in view of user goals with respect to other attributes of the training sample set. This leads to a training sample set that results in a more accurate machine-learning model and a model that performs as desired by a user. Thus, the described system and method provides a more flexible training sample set generation that results in a more accurate machine-learning model as compared to traditional techniques.

FIG. 1 illustrates a method for generating a training sample set for training a machine-learning model from a sample set that has imbalanced class sample sizes where the training sample set is generated in view of goals of a user for attributes of the training sample set. At 101, the system receives a sample set for training a machine-learning model. The system may be a central server, a component of a machine-learning model training system, an application, or the like. To receive the sample set, the system may access one or more data storage locations that include data that can be utilized for generating a training dataset, also referred to as a training sample set. The data storage locations may include data that can be pulled and aggregated into a single dataset. Each of the data storage locations may be included within a single platform, across multiple platforms, with the same network, across different networks, or a combination thereof. For example, some data storage locations may be contained within a local network, a remote network, a cloud storage location, multiple cloud storage locations, and the like. Once the data storage location(s) are accessed, the system may pull and aggregate data that is applicable to the machine-learning model into a sample set.

Each sample within the sample set includes labels or annotations which identify how the sample should be classified. The sample set includes a plurality of classes of data. Each class of data corresponds to a different classification of a sample. Using the simple binary example mentioned above, one class may be images of dogs and one class may be images of cats. Thus, each image within the sample set would be labeled with a label of either a cat or a dog. As stated before, the described system can be utilized for sample sets having many different classes. The simple binary example is not intended to limit the scope of this disclosure in any way.

The sample set also includes at least one class imbalance. A class imbalance occurs when the sample set has at least one minority class and at least one majority class. A minority class is a class within the sample set that has a fewer number of samples as compared to a majority class that has a larger number of samples. In other words, the minority class has a lower number of samples as compared with the number of samples within the majority class. The sample set may include multiple minority classes and/or multiple majority classes. What constitutes a class imbalance may be defined by a user, a default threshold defined by the system, and/or based upon an application of the machine-learning model. For example, some applications may require the number of samples within each class to be more closely matched than other applications. The class imbalance may be defined by a certain number of samples (e.g., a difference in the number of samples exceeding a certain number or a certain range constitutes a class imbalance), a percentage of samples (e.g., a difference in the number of samples exceeding a certain percentage of the majority class number of samples constitutes a class imbalance), a ratio of samples (e.g., a ratio between the number of minority class samples and the number of majority class samples exceeding a predetermined ratio constitutes a class imbalance), or the like.

At 102, the system creates an enlarged minority class. The goal with the enlarged minority class is to end up with a number of samples in the enlarged minority class such that the difference in sample numbers between the enlarged minority class and the majority class no longer constitute a class imbalance. In other words, the difference in the number of samples in the enlarged minority class and the number of samples in the majority class would not be considered a class imbalance using the class imbalance definition for the current application. In some cases, this may mean that the number of samples in the enlarged minority class is equal to or matches the number of samples in the majority class. In other cases, there may be a difference between the number of samples in the enlarged minority class and the majority class. However, the difference will be within the defined criteria for a class imbalance.

To create the enlarged minority class, the system utilizes an over-sampling technique or algorithm to generate new samples from or based upon the samples in the minority class. The samples originally contained within the minority class will be referred to as the original samples and the generated samples will be referred to as the added samples. The added samples are added to the original samples to create the enlarged minority class.

At 103, the system selects subset samples from both the samples within the enlarged minority class and the majority class. In other words, the system analyzes the samples of both the enlarged minority class and the majority class to select samples that should be included in a subset of the sample set obtained at 101. To select the subset samples, the system employs a neural network that includes one or more input layers, one or more hidden layers, and one or more output layers. The input layer(s) receive each one of the samples within the enlarged minority class and the majority class, referred to as input samples. The input layer may receive or create a feature map of the input samples. The hidden layers analyze the features of the input samples. For each sample, the neural network, using the hidden layers, determines whether the sample should be included in a final dataset, referred to as the training sample set or training dataset. The output layer then provides each sample with its corresponding determination as output.

To determine whether a sample should be included in the final dataset, the neural network generates a probability score for each of the input samples. The probability score indicates a probability that the sample should be included in the final dataset. In other words, the probability score corresponds to a probability of inclusion for each of the input samples. For the initial pass, the probability score may be based on remediating the class imbalance. Additionally, or alternatively, the probability score may also be based upon other criteria of the samples or goals of a user, as discussed further herein with respect to subsequent iterations. The probability score of each input sample is compared to a probability threshold and those input samples having a probability score meeting or exceeding a predetermined threshold will be included in the subset sample set. This technique results in an output that can be defined as an over-sampled output, an under-sampled output, or a combination of over-sampled and under-sampled output. In other words, the neural network can use either an over-sampling technique, an under-sampling technique, or a combination of an over-sampling and under-sampling technique to arrive at the subset sample set.

An over-sampled output would mean that all samples of the enlarged minority class and the majority class are included in the subset sample set. An under-sampled output would mean that only the original samples of the minority class, meaning no added or new samples in the enlarged minority class are included, and only a subset of the majority class samples is included in the subset sample set. The subset of the majority class samples would be a number of samples that reduces the size of the majority class such that the number of samples in the decreased majority class and the number of samples in the minority class having only the original samples are within the class imbalance criteria. A combination output would mean that at least some of the added samples of the enlarged minority class and less than all of the samples in the majority class are included in the subset sample set.

Thus, the described system allows the system to determine which sampling technique (i.e., over-sampling, under-sampling, a combination of both) should be utilized to generate the subset sample set. In other words, the system can automatically determine what sampling technique to utilize on the input samples to generate the subset sample set. Also, the sampling technique can be dynamically chosen and modified for each sample within the input samples. Additionally, the sampling technique can change through different iterations of generating the subset sample set, as discussed in further detail herein. Further, the user does not have to define a particular percentage of samples to be over and/or under-sampled. This provides more flexibility than traditional techniques in which either an over-sampling or under-sampling technique is utilized and the user has to define which technique to use. Additionally, the resulting subset sample set is a better sample set than traditional techniques because other attributes of the samples can be taken into account when selecting the samples to include in the subset sample set.

The output, or subset sample set, is passed to a reward generation mechanism. The reward generation mechanism weights each of the subset samples, at 104, based upon user input that defines goals for attributes of the training sample set to be used in training the machine-learning model. In other words, the reward generation mechanism weights each of the subset samples in view of user-defined goals. While class balance is always one goal, the user may have other goals with respect to the samples that will be included in the training dataset. These goals may include label noise, class overlap, model bias, class sample size, model boundary complexity, interclass distance, intraclass distance, a number of outliers, and the like. When providing the goals, the user may also identify a weight to be given to a particular goal. The weight identifies high strong or tight the goal is. For example, a user may provide a goal of balance having a weight of 100, noise having a weight of 5, and bias having a weight of 0. This means that the user wants the sample set to be 100% balanced, having 5% maximum noise, and the bias of the model should be 0%.

A label noise goal provides an indication of how noisy the training dataset should be. A label noise goal is generally provided in the form of a maximum noise level for the labels in the dataset. A class overlap goal provides an indication of how much overlap can occur between different classes of samples and is generally defined as a maximum class overlap amount or percentage. A model bias goal is generally defined as a maximum bias for a model trained using the samples. A model boundary complexity goal is generally defined as how complex a boundary within the model can be for a model trained using the samples. Interclass and intraclass distance goals are generally defined as a maximum distance between samples between classes or within a class. Outlier goals are generally defined as a maximum number of outliers for the sample set. It should be understood that other quality goals, or other user goals, can be defined and the goals may be defined in other ways. For example, depending on the application for the model, the user may want a minimum amount of noise, model bias, class overlap, or the like.

Based upon the goals, including class balance, the reward generation mechanism weights the samples in the subset sample set. The reward generation mechanism generates reward scores for each of the samples in the subset sample set based upon the goals of the user. A reward score may be a value between −1 and 1. A 1 corresponds to a sample that fully supports or meets a goal. A −1 corresponds to a sample that does not support or is detrimental to the one or more goals of the user. A value between 0 and 1 would indicate that the sample somewhat supports or fulfill the goals of the user, with a value closer to 0 indicating that the sample is less supportive of the goal as compared to a value closer to 1. A value between −1 and 0 would indicate that the sample is detrimental to the one or more goals with a value closer to 0 indicating a less detrimental sample as compared to a sample closer to −1. In other words, samples that support but do not fulfill a desired goal will not have as high of a weighting as samples that fully support a goal, but the more supportive samples will have higher weightings than less supportive samples. Other reward scores may be utilized, for example, positive and negative values, only positive or negative values, a greater range of values, or the like. Thus, the reward generation mechanism rewards desired samples and penalizes undesired samples.

As an example, reward generation result, assume that an overall quality goal is 0.98. The quality of the original samples (i.e., original minority class samples and majority class samples) is 0.8. The quality of the subset sample set is 0.9. Since the new quality does not meet the goal of 0.98, but is an improvement over the original quality of 0.8, the reward generation mechanism will reward this sample. However, it will not result in a reward of 1 because it does not meet the overall quality goal of 0.98. One technique to determine the reward weighting is by taking the difference in quality (0.9−0.8=0.1) divided by the normalization factor of the improved quality score minus the original quality score (0.98−0.8=0.18), thereby resulting in a 55% improvement which corresponds to a reward weighting of 0.5. On the other hand, if the new quality were to meet the goal of 0.98, the reward weighting would be 1. Alternatively, if the new quality were less than the original quality of 0.8, the reward weighting would be between −1 and 0. Using the example above, if the new quality were 0.7 instead of 0.9, the calculation would be similar and would result in a reward of −0.5 instead of 0.5.

The system may generate a final reward value for the entire subset sample set by using one or more aggregation techniques. For example, the system may use a simple averaging technique where all the reward values are added together and divided by the number of samples. As another example, the system may use a weighted average or weighted combination technique where positive rewards having a higher weighting than negative rewards. As another example, the system may use a weight average or weighted combination technique where certain goals and samples supporting those goals, are weighted higher than other goals and samples corresponding to those goals.

Once the subset sample set samples are weighted, the system determines if the subset sample set meets the goals of the user at 105. If the goals of the user are not met at 105, the system re-runs the selection of subset samples at the neural network at 106 in view of the goal weightings. In other words, the system re-runs step 103 with the goal weightings. Thus, this new iteration takes into account the goals of the user with respect to the attributes of the samples. In other words, in this new iteration, the neural network does not just focus on the class imbalance, but also takes into account the goals of the user. This is an improvement over traditional techniques which do not take into account any attributes of the samples other than the class imbalance. The subset sample set that results from this new iteration is then sent to the reward generation mechanism for new weightings based upon the user goals. It should be noted that the user goals can change between iterations. For example, the user may define a particular goal or goal weighting in a first iteration and change the goal or goal weighting in a subsequent iteration. The system then determines if this new subset sample set meets the goals of the user at 105. If the goals are not met, then a new iteration of selecting and weighting is performed.

Once the goals of the user are met with a subset sample set at 105, the system generates the training sample set at 107. In other words, the system runs the iterative process of utilizing the neural network to select samples and weight the samples based upon the user goals until the goals are met and then generates a training sample set using the subset sample set that met the goals of the user. This training sample set can then be used to train the machine-learning model. Since the training sample set has been refined based upon the user goals and the class imbalance, the resulting training sample set will result in a machine-learning model that fulfills the goals of the user, thereby making a more accurate model.

Figure 2:
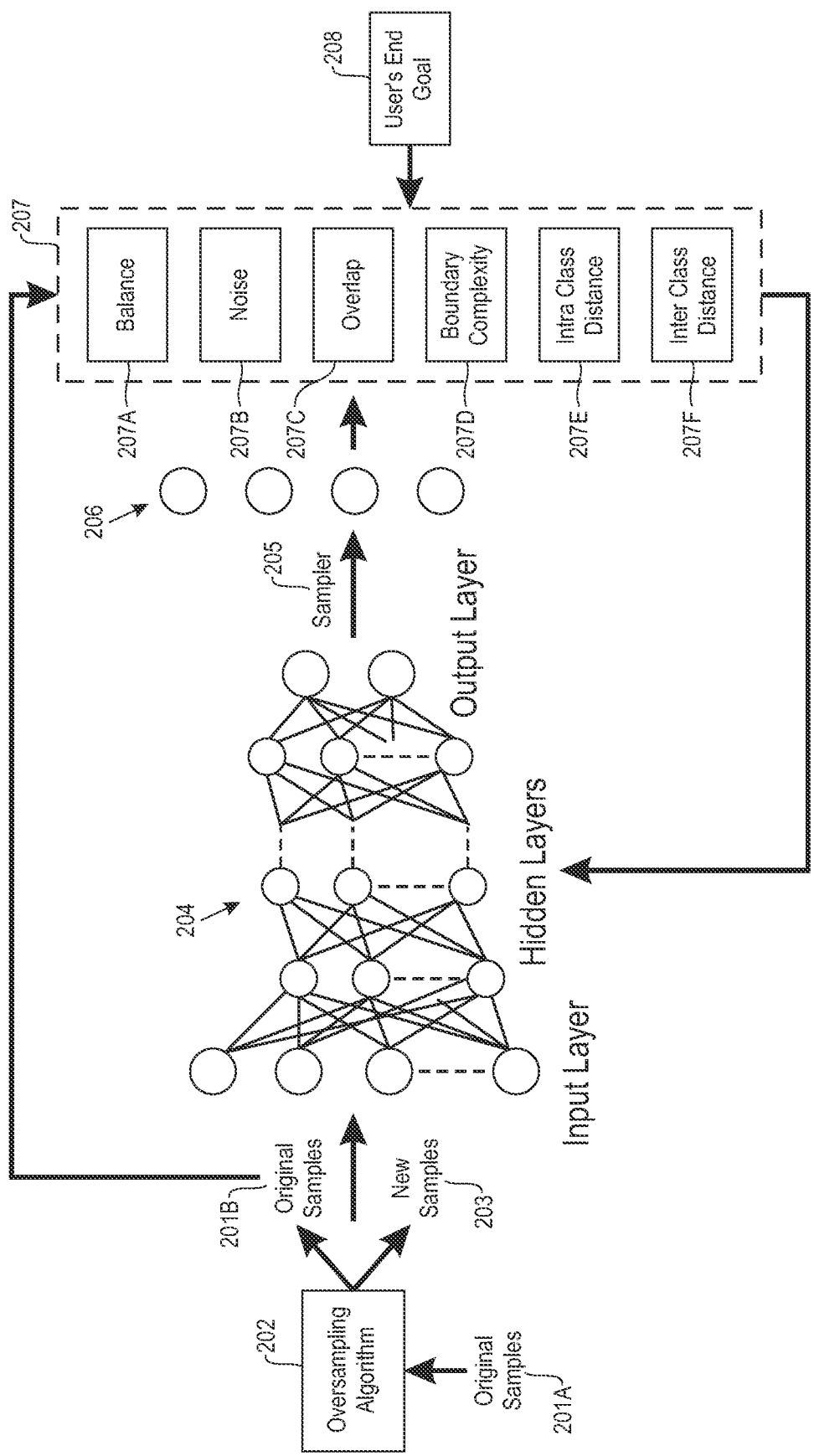
FIG. 2 illustrates an example overall system architecture for generating a training sample set for training a machine-learning model from a sample set that has imbalanced class sample sizes where the training sample set is generated in view of goals of a user for attributes of the training sample set.

FIG. 2 illustrates an overall system for generating a training sample set for training a machine-learning model from a sample set that has imbalanced class sample sizes where the training sample set is generated in view of goals of a user for attributes of the training sample set. Original samples of a minority class 201A are sent through an oversampling algorithm 202 to generate new samples 203. The original samples 201B and new samples 203 are provided to a neural network 204 having an input layer, hidden layers, and output layer. The neural network 204 generates a probability score for each of the samples 201B and 203. The samples with the probability scores are sent to a sampler 205 which compares the probability score of each sample to a threshold. Samples having a probability score higher than a predetermined threshold will be included in a subset sample set 206.

The subset sample set 206 is passed to a reward generation mechanism 207 which weights the samples based upon one or more user goals 208. For example, the reward generation mechanism 207 may weight the samples based upon balance 207A, noise 207B, overlap 207C, boundary complexity 207D, intraclass distance 207E, interclass distance 207F, and/or the like. The reward generation mechanism compares the quality values of the sample subset set to the quality values of the original samples 201B. Samples having quality values greater than the original quality values result in a rewarded weighting. Samples having quality values less than the original quality values result in a penalized weighted. The neural network, sampling, and weighting steps are iteratively performed until the user's end goals 208 are reached, thereby resulting in a final sample set which is turned into a training sample set for training a machine-learning model.

Figure 3:
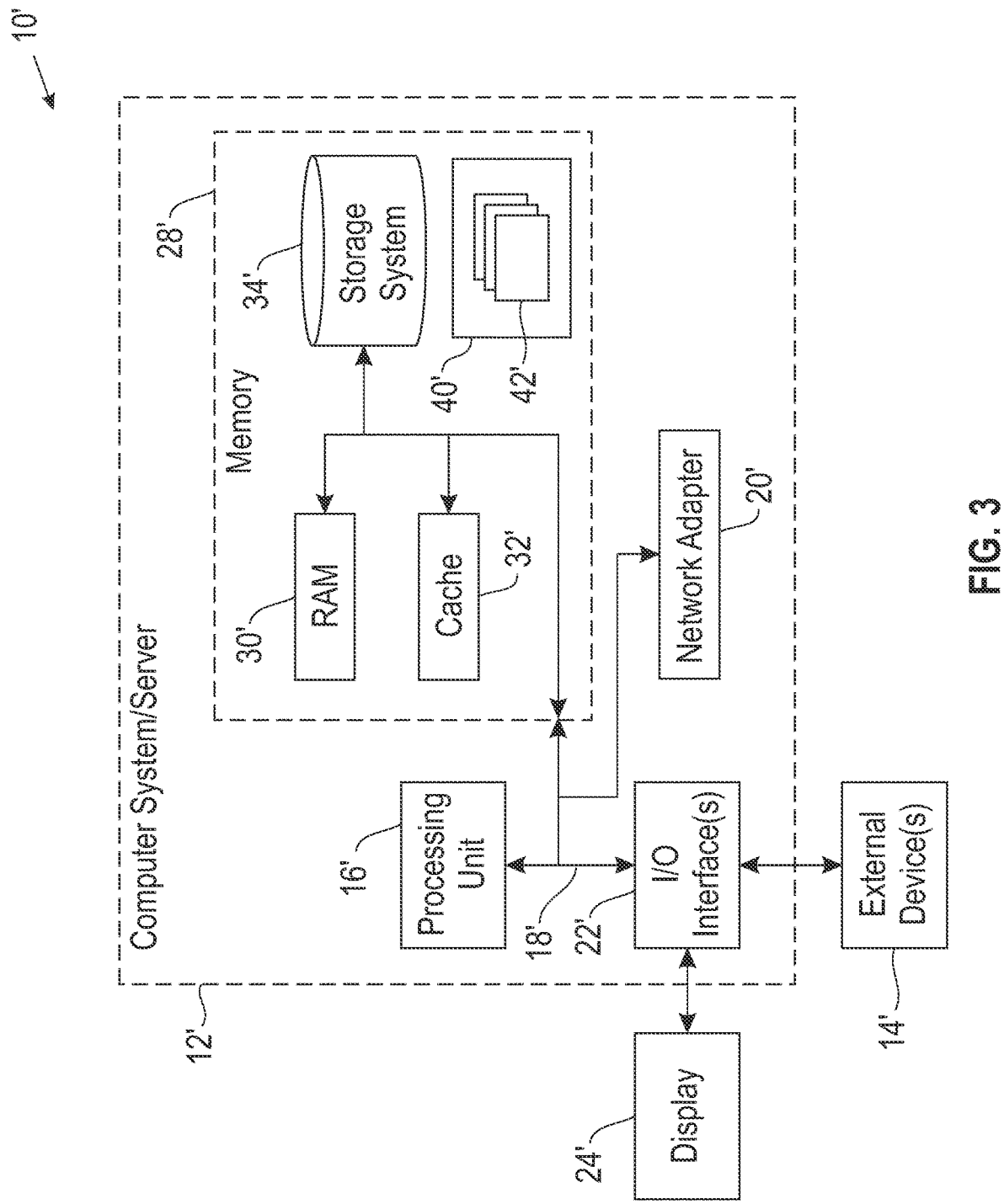
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, including:
receiving a sample set for training a machine-learning model, wherein the sample set includes a plurality of classes, each of the plurality of classes having corresponding samples, wherein the sample set includes a minority class within the plurality of classes having a lower number of samples as compared to a number of samples within a majority class within the plurality of classes;
creating an enlarged minority class by generating, for the minority class, new samples from the samples within the minority class and adding the new samples to the minority class;
selecting, using a neural network, subset samples from both the samples within the enlarged minority class and the majority class, wherein the selecting includes generating a probability score for each of the samples within the enlarged minority class and the majority class and selecting samples for the subset samples having a probability score at least meeting a predetermined threshold;
weighting each of the subset samples based upon user input defining goals for attributes of a training sample set to be used in training the machine-learning model; and
generating, using the neural network, the training sample set by re-running the selecting in view of the weighting.

2. The method of claim 1, wherein the generating new samples includes generating a number of new samples such that the number of samples within the enlarged minority class match the number of samples within the majority class.

3. The method of claim 1, wherein the selecting includes selecting all samples included in the enlarged minority class and all samples included in the majority class.

4. The method of claim 1, wherein the selecting includes selecting the samples included in the minority class, no new samples, and a subset of the samples of the majority class.

5. The method of claim 1, wherein the selecting includes selecting a subset of the samples within the enlarged minority class and a subset of samples within the majority class.

6. The method of claim 1, wherein the selecting is automatically performed in view of goals of a user, wherein the goals identify attributes of the subset samples.

7. The method of claim 1, wherein the generating the training sample set includes an iterative process of the selecting and the weighting until the goals are met.

8. The method of claim 1, wherein the weighting penalizes subset samples not meeting the goals and rewarding subset samples meeting the goals.

9. The method of claim 1, wherein the selecting includes analyzing features of each of the samples within the enlarged minority class and the majority class.

10. The method of claim 1, wherein the goals include at least one of: class balance, label noise, class overlap, model bias, class sample size, model boundary complexity, interclass distance, and intraclass distance.

11. An apparatus, including:
at least one processor; and
a computer readable storage medium having computer readable program code embodied therewith and executable by the at least one processor;
wherein the computer readable program code is configured to receive a sample set for training a machine-learning model, wherein the sample set includes a plurality of classes, each of the plurality of classes having corresponding samples, wherein the sample set includes a minority class within the plurality of classes having a lower number of samples as compared to a number of samples within a majority class within the plurality of classes;
wherein the computer readable program code is configured to create an enlarged minority class by generating, for the minority class, new samples from the samples within the minority class and adding the new samples to the minority class;
wherein the computer readable program code is configured to select, using a neural network, subset samples from both the samples within the enlarged minority class and the majority class, wherein the selecting includes generating a probability score for each of the samples within the enlarged minority class and the majority class and selecting samples for the subset samples having a probability score at least meeting a predetermined threshold;
wherein the computer readable program code is configured to weight each of the subset samples based upon user input defining goals for attributes of a training sample set to be used in training the machine-learning model; and
wherein the computer readable program code is configured to generate, using the neural network, the training sample set by re-running the selecting in view of the weighting.

12. A computer program product, including:
a computer readable storage medium having computer readable program code embodied therewith, the computer readable program code executable by a processor;
wherein the computer readable program code is configured to receive a sample set for training a machine-learning model, wherein the sample set includes a plurality of classes, each of the plurality of classes having corresponding samples, wherein the sample set includes a minority class within the plurality of classes having a lower number of samples as compared to a number of samples within a majority class within the plurality of classes;
wherein the computer readable program code is configured to create an enlarged minority class by generating, for the minority class, new samples from the samples within the minority class and adding the new samples to the minority class;
wherein the computer readable program code is configured to select, using a neural network, subset samples from both the samples within the enlarged minority class and the majority class, wherein the selecting includes generating a probability score for each of the samples within the enlarged minority class and the majority class and selecting samples for the subset samples having a probability score at least meeting a predetermined threshold;
wherein the computer readable program code is configured to weight each of the subset samples based upon user input defining goals for attributes of a training sample set to be used in training the machine-learning model; and
wherein the computer readable program code is configured to generate, using the neural network, the training sample set by re-running the selecting in view of the weighting.

13. The computer program product of claim 12, wherein the generating new samples includes generating a number of new samples such that the number of samples within the enlarged minority class match the number of samples within the majority class.

14. The computer program product of claim 12, wherein the selecting includes selecting all samples included in the enlarged minority class and all samples included in the majority class.

15. The computer program product of claim 12, wherein the selecting includes selecting the samples included in the minority class, no new samples, and a subset of the samples of the majority class.

16. The computer program product of claim 12, wherein the selecting includes selecting a subset of the samples within the enlarged minority class and a subset of samples within the majority class.

17. The computer program product of claim 12, wherein the selecting is automatically performed in view of goals of a user, wherein the goals identify attributes of the subset samples.

18. The computer program product of claim 12, wherein the generating the training sample set includes an iterative process of the selecting and the weighting until the goals are met.

19. The computer program product of claim 12, wherein the weighting penalizes subset samples not meeting the goals and rewarding subset samples meeting the goals.

20. The computer program product of claim 12, wherein the selecting includes analyzing features of each of the samples within the enlarged minority class and the majority class.

* * * * *